United States Patent Office 2,840,494
Patented June 24, 1958

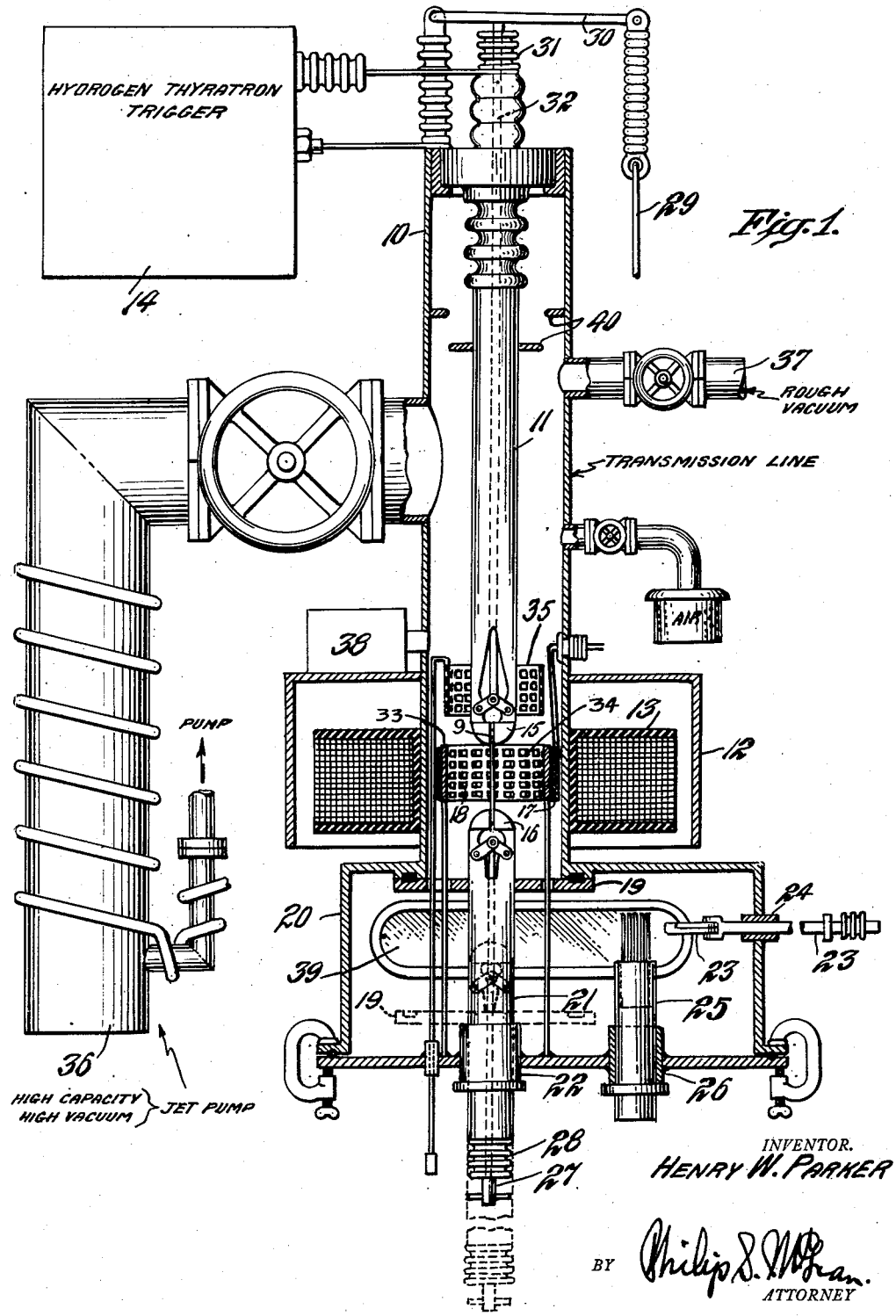

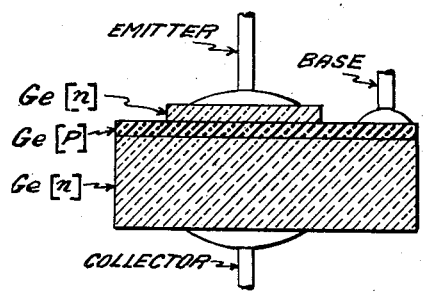
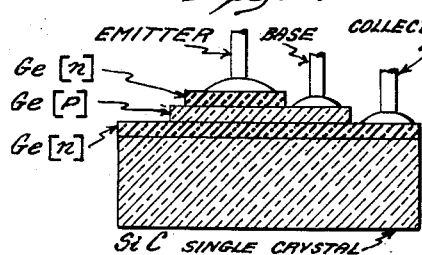
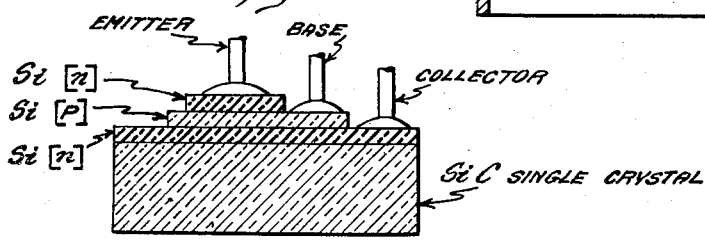
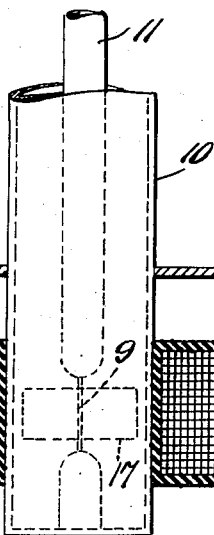
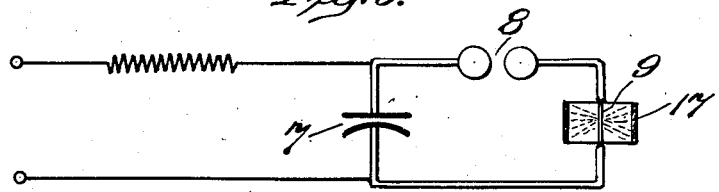

2,840,494
MANUFACTURE OF TRANSISTORS
Henry W. Parker, Flushing, N. Y.
Application December 31, 1952, Serial No. 329,071
23 Claims. (Cl. 148—1.5)

The invention herein disclosed relates to the deposition of refractory metals or alloys and is more particularly, though not exclusively concerned with the manufacture of transistors.

The more general objects of the invention are to attain greater uniformity in product than has been possible under methods at present in use, to reduce the costs of production and to speed up and generally improve commercial production methods and apparatus.

Special objects of the invention are to accurately govern and control the amount and the uniform dissemination or distribution of the impurities or contaminants which, in the case of the transistor, determine the electrical sign of the applied crystal coating.

Accurate control is attained in the present invention by depositing the refractory metal or alloy in a true gaseous phase. In this manner uniform distribution of the characterizing contaminant is effected.

Special apparatus is required for the purpose, the same constituting part of the present invention.

In the drawing accompanying and forming part of this specification an embodiment of such apparatus is shown, but with appreciation of the fact that the actual physical structure may be modified and changed in various ways, all within the true intent and broad scope of the invention as hereinafter defined and claimed.

Fig. 1 in the drawing is a partly diagrammatic and partly sectional view illustrating a form of apparatus for effecting the true gas phase deposition of refractory metals or alloys in the manufacture of transistors;

Figs. 2, 3 and 4 are diagrammatic views illustrating different forms of transistors produced in the apparatus;

Fig. 5 is a wiring diagram;

Fig. 6 is a broken sectional and diagrammatic representation of the wire explosion chamber.

For purposes of disclosure it may be considered that the apparatus is to be used for manufacture of the npn transistor.

The elements in group IVB of the periodic table (4 electrons in the outer orbit), carbon, silicon, germanium and tin, make up the body of a semiconductor. The diamond form of carbon is expensive and gray tin is unsuitable because of instability at room temperature, leaving silicon and germanium suitable for present purposes.

Pure germanium or silicon contaminated with a slight amount of aluminum, boron, gallium or indium, provides a "hole" or positive p-type semiconductor.

An n-type semiconductor may be provided by using germanium or silicon contaminated with a slight amount of antimony, arsenic or phosphorus.

By making a sandwich npn, observing caution to maintain the essential single crystal lattice structure, new electrical effects are obtained, as described in current technical literature.

The greatest success to date has been derived from the single crystal growing process which requires "pulling" a frozen crystal slowly out of a molten bath of germanium having some of the significant contaminants alloyed with the molten metal. Slow pulling favors retention of one type of contaminant over the other and fast pulling favors retention of the other type contaminant, but difficulties arise because of the mixture of the n and p properties. Controllability is thus dependent on a host of variables such as pulling rate, the amount and kind of the contaminant, the temperature of the bath, the thermal gradient in the crystal, etc.

In another process employed in the manufacture of np (diode) junctions, a thin film of germanium single crystal is used with a diffusion of one of the boron, aluminum group on one side, and a diffusion of one of the antimony, arsenic group on the other side.

The present invention involves the epitaxic deposition of the desired layers by bursts of true metal gas. The expression "true gas" is intended to denote a superheated metallic gas wherein all of the metal is in a monomolecular state and is entirely free from any molecular agglomerates or partially condensed particles of metal, as in a vapor.

In the case of the npn transistor under consideration, the process may be carried out using a single crystal of germanium of the n-type having resistivity of about 10 ohms cm. as a seeding substrate. On this there is condensed a thin film of metal of p-type germanium, out of the gas phase of the germanium and its accompanying contaminant. This thin film is given an interval of time to adjust itself as a single crystal by the phenomenon of epitaxy, by heating the seed crystal in the annealing zone of temperature before another successive film is laid down from the gas phase of the germanium. This interval of time required for the fresh film to adjust itself to the lattice structure of the seeding lattice is essential. Also, the heating of the seed crystal to annealing temperature to speed up the lattice adjustment time is important.

The succeeding layer of metal is not condensed until the first layer has completed its lattice adjustment and the layers are laid down as successive bursts of true metal gas at prescribed intervals of time such as about 10 to 15 seconds.

The p-type germanium applied to the seed crystal has a resistivity of about 1 ohm cm. in bulk measurement.

The gas phase of the p-type germanium is produced by electrically "exploding" a small wire of germanium in high vacuum, causing the germanium to form a true gas mixture with its contaminant at a temperature on the order of 20,000° C., or much greater than sun temperature, approximately 6,000° C.

This high temperature explosion creates a transient high temperature expanding metal gas cloud in high vacuum.

It will be apparent that this temperature is sufficiently high so that a true monomolecular gas which is free from solid particles or liquid components will be produced as a result of the "explosion."

Assuming that the exploder completely gasifies a wire 0.005" diameter by 5 cm. long, the volume of such wire is $6.32 \times 10^{-4}$ cubic cm.

With a target in the form of a hollow cylinder surrounding the wire and having an internal radius of 5 cm. and a length of 3 cm., the area of the inside surface of the cylinder will be 94.2 sq. cm. If one-half of the exploded material reaches the target, the thickness of the deposit will be $3.36 \times 10^{-6}$ cm. In such case it may take approximately 755 of such layers to provide a thickness of one-thousandth of an inch. At a rate of about 250 layers per hour, this may take three hours to build up a deposit of 0.001" material.

In this time, however, there is obtained practically uniform deposition of the contaminant in the transitory gas phase and even population of the contaminant throughout the deposited germanium. Also, the time is of less consequence when it is considered that several thousand of the small size transistors may be processed at once.

The deposition of the metal is in a high vacuum in the absence of oxygen, with no oxidizing effects to contend with.

The gas phase is ideal for the mixing of the two elements, avoiding the almost uncontrollable effects of unevenness when the contaminant is pushed at the solidus-liquiduus interface in the "pulling" technique, causing uneven distribution of contaminant centers along irregularities in the single crystal lattice structure in almost random effect, as in the case of making a single crystal of germanium from the melt.

Precise layer thickness of predetermined composition can be laid down. Precision control of very thin p-type layers is advantageous in transistors for radio frequencies of the order of tens of magacycles. This process is particularly suited to such production requirements.

The size and thickness of these transistors can be governed depending on whether they are to be used as rectifiers or as amplifiers for different purposes.

After deposition of the p-type germanium the wire in the high vacuum chamber may be changed, in the example, to 0.01 ohm cm. n-type germanium and several hundred shots of n-type then be laid down on top of the p-type.

By the epitaxy process the operation is still one of growing a single crystal initiated by the crystal started with.

After the required number of layers have been laid down and each layer has been successively grown to form the desired single crystal, after cooling, the high vacuum is let down to air and the target cylinder is removed.

The transistors may then be separated and with electrodes attached, tested as completed units, and then encased in protective coatings applied as a second operation to shut out the weathering effects of water vapor.

The npn transistor described has only two evaporated layers laid down on a seed crystal which makes up the third region of the sandwich npn.

The seeding single crystal of germanium used in this example, although desirable, is not essential because a pinakoid crystal of silicon carbide may be substituted for the seeding. This is possible because the lattice pattern of the silicon carbide crystal structure is compatible with the germanium lattice.

The flat plates of selected commercial carborundum, after processing to present a clean surface, furnish suitable epitaxic surfaces for growing a monocrystal of germanium in the form of triple layers of deposits from the gas phase of the metal and its contaminants as an npn semiconductor.

The silicon carbide has mirror-like pinakoid faces which provide a strong, rigid epitaxic surface for starting the growth of germanium npn triple single crystal sandwich. The silicon carbide provides mechanical strength as well as the epitaxic surface.

The silicon semiconductor in some ways is superior in electrical performance to germanium.

It may therefore be of advantage to use a wire of powdered silicon sintered dust to lay down n-type and p-type silicon as a monocrystal triple region multiple layer sandwich, with or without the silicon carbide backbone.

The silicon semiconductor has not been favored up to the present time because of the high furnace temperatures involved in silicon processing.

The present invention, however, enables the transformation into a true gas of any refractory metals including the semiconductors, enabling the handling of silicon as well as other materials.

The present invention affords not only precision control but extends the design possibilities to other, considered more difficult fields.

Figs. 2, 3 and 4 may be referred to here as illustrating examples typifying products of the invention thus far described, Fig. 2 showing the first type with a player and an n layer on a single germanium crystal, Fig. 3 showing a second type with an n layer, a p layer and an n layer on a silicon carbide backbone, and Fig. 4 showing a third type with the npn layers on a silicon carbide backbone.

To visualize the action of the exploder attention is directed to Fig. 5. This shows in elementary fashion how a condenser at 7 charged to a high voltage, is discharged through a sphere gap 8 in series with a small wire 9. By way of example, the energy stored in the condenser is $\frac{1}{2}CV^2$, which for V of 20,000 volts and C of one microfarad gives 200 watt seconds. This energy is dissipated at a rapid rate (86% in RC seconds because discharge into an exploding wire is aperiodic so voltage remaining on the plates of the condenser will be 36.8% at RC seconds later, but the energy is $\frac{1}{2}CV^2$ so that $$36.8\% \times 36.8\%$$

is 13.6% remaining or, as mentioned, 86% of the initial energy stored in the condenser is used up in RC seconds) which for 10 ohms and 1 microfarad is 10 microseconds of time. 200 watt seconds dissipated in 10 microseconds is a rate of 20 megawatts. Since a wire 0.005" diameter by 5 cm. long weighs 3.37 milligrams for germanium wire, and it requires 3.28 electron volts of thermal energy to heat to 25,000° K. plus 8.09 electron volts to ionize the germanium, the total requirement is only 51 watt seconds to raise the germanium wire to 25,000° C.

Significantly, radiation effects of emission of light has been neglected because of the 10 microsecond duration of the process. Actually the radiation figure is 2.24 megawatts per sq. cm. at 25,000° K.; but this only amounts to 22.4 watts sec. in 10 microseconds. This 22.4 watts sec. added to the 51 watts sec. gives 73.4 watts sec. total energy required for the 10 microsecond flash. From these elementary considerations it is evident that exploding the wire across a 20 kv. 1 microfarad condenser will raise the temperature of the metal higher than 25,000° K., since 200 watt seconds of energy is available.

At 25,000° Kelvin the maximum energy in the radiated light occurs at 1150 angstrom units (compared with 5500 A. U. for sunlight). Hence the flash should appear deep blue in color.

To prevent the wire being blown to one side by the transiently strong magnetic field set up by the violent surge of electric current, the exploder may be enclosed in a coaxial transmission line so that resulting magnetic fields will be symmetrical axially. The coaxial line is also desirable because the outer conductor can be safely grounded.

Additionally, it has been found desirable to add an external high permeability magnetic shield to prevent small magnetic fields of the order of a few gauss from entering the wire explosion chamber.

Further, to avoid "skin effect" causing the surface metal of the wire to be evaporated first and thus form a gas surrounding the wire which, acting as an arc plasma, would shunt the current away from the wire and cause incomplete consumption, a large coaxial inductor of several henries may be used to create a strong axial magnetic field of about 1,000 gauss to confine the arc to a very small volume on the axis of the wire. This external axially directed field confines the arc to a small cylindrical volume of less than 1 cm. diameter, allowing complete gasification of the refractory metal of the wire and increasing control of the process.

Fig. 6 illustrates diagrammatically features last described, including the wire 9 connected in the coaxial transmission line 10, 11, within the magnetic shield 12, screening small fields and surrounded by the axially directed magnetic field 13 for confining the metal vapor arc of short duration.

The electrical magnitudes involved correspond closely to the magnetron excitation circuits used in radar.

Consequently a commercially available pulse forming network delivering a 10 microsecond square wave pulse, triggered by a 700 ampere hydrogen thyratron at approximately 15,000 volts, may be employed for the wire exploder. This arrangement avoids the use of a sphere gap such as indicated in the fundamental diagram and provides a controllable timer for the shots on a manually controlled or on an automatic machine.

This hydrogen thyratron trigger is indicated at 14 in the general view of the machine, Fig. 1.

In this view the wire 9 is shown gripped between the upper and lower pairs of jaws 15, 16, of the coaxial transmission line made up of the outer and inner conductors 10, 11.

The outer conducting member 10 is shown of a size to constitute a high vacuum chamber for containing the wire grips and the surrounding, cylindrical target 17 carrying the seed crystals 18.

This chamber is closed and sealed at the bottom by a cover plate 19 which can be lowered into the wire supply chamber 20.

Actually the vacuum chamber cover is shown carried by the plunger 21 which carries the lower set of jaws and is slidingly guided through a close sealing gland 22 in the bottom of chamber 20.

Plunger 21 may be lowered as indicated in broken lines, to bring the lower pair of jaws into the range of the wire manipulating "scissor" 23 projecting through a sliding seal 24 in the side of the lower compartment.

This scissor or pincer may be manipulated externally to pick up a wire from the quiver 25, having a sliding seal mounting 26 in the bottom of the chamber, and to carry the extracted wire into the bite of the lowered wire jaws 16 which at the time may be opened by pulling down on the jaw opening rod 27 sealed in the outer end of the pluger as by means of sylphon 28.

The upper jaws 15 may be opened to take the upper end of the wire, by downward pull on a connection 29 at the outer end of pivoted lever 30 which, through sylphon 31, is connected with the jaw opening rod 32.

The target ring 17 is removably supported in the vacuum chamber in position about the free length of wire held between the two clamps and is equipped with or surrounded by a heater 33.

The seed crystals may be supported in definitely positioned relation on the inner face of the target by being "soldered" or otherwise secured on a zirconium foil sheet at 34.

If desired, a mask 35 may be lowered inside the target to cover portions of the crystals which should be left blank for electrodes or terminals.

A high capacity, high vacuum jet pump may be connected to the high vacuum chamber as indicated at 36, and rough vacuum be connected at 37.

The quiver 25 may be compartmented or made up in sections carrying different type wires and be rotatably supported and operable from the outside so as to be turned to carry different p and n-type wires into the range of the scissor.

The degree of high vacuum required is determined by the minimum "mean free path" allowable so that there will be negligible probability of a fast moving germanium atom striking a residual gas atom in the exploder chamber while travelling to the target. A vacuum of 0.076 micron will provide a mean free path for it of 100 cm., which is large compared with the 5 cm. path which the germanium is obliged to travel. This means that a high vacuum has to be maintained at all times during the process. The rugged Knudsen type of absolute pressure gage which measures pressures down to 0.001 micron, is preferred for the process, being indicated at 38.

The wires used in the process are generally of the non-ductile class, not commercially available as drawn wire, and these may be made of pressed powder as produced by "powdered metal metallurgy." These wires are brittle and come in short, straight lengths suitable for use in the exploder.

When the wire explodes there is a short time when the arc will strike the jaws forming the electrodes. These, therefore, may be screwed-on or otherwise removable jaw inserts of the same material as the wires, for replacement in case of change of the wire material. Thus in shooting n and p germanium the jaw inserts may be a good grade of germanium throughout the process but should be changed, for example, if the machine is to be used for shooting silicon.

It is important that the heater used for epitaxy and time interval for adjustment of the fresh film to the substrate lattice, have a non-inductive winding so that there will be no undesirable misdirected magnetic field. This heater may maintain a temperature of the target of germanium at 400 to 600° C. For silicon a different range of temperature may be used, in each instance the particular annealing range of the metal.

In Figs. 2, 3 and 4 the n p and n layers are shown pyramided to allow electrical connection to the n, p and n regions. This may be accomplished as heretofore indicated, by introducing a masking shadowing strip at the time of changing the n wires for p wires.

At the 20 kv. discharge soft X-rays are generated as well as ultraviolet light. The transmission line having metal walls, shields the operation from harmful effects of these radiations and the peephole shown at 39 for watching the process may have a sufficiently thick glass window to act as a shield.

In the practical example given, a piece of high purity n-type germanium is used as a "collector." A p-type germanium layer is vacuum deposited as a single crystal growth on the collector by the phenomenon of epitaxy, and this p layer becomes the "base." Continuing the single crystal growth, another layer of the n-type is added to form the emitter.

The seed may be the collector high purity n-type germanium grown as part of a large single crystal out of a molten bath of germanium in a hydrogen or helium atmosphere, after the manner of producing single crystals by use of a thermal gradient or "pulling" technique.

The exploding wire of germanium provides a transient gas cloud of the metal in which the metal and the small amount of necessary contaminant are freely and uniformly mixed for codeposition on the target, thus affording a super-lattice distribution of the contaminant centers and hence constant or uniform characteristics.

The products can be kept to the precision of one millionth of an inch by predetermined count of the number of shots, and this enables accurate control of the width of the base layer, a desirable feature for high frequency transistors.

The deposition is accomplished in a high vacuum free of water vapor, oxygen, hydrogen and other residual gases.

The deposition is made in a series of built-up thin layers having the same composition as the exploded wire but with the contaminant not lumped or streaked but uniformly distributed because thoroughly mixed in the high temperature transient gas cloud of the exploded wire and in a distribution so uniform that the contaminant forms a superlattice giving the maximum transistor effect with the least amount of contaminant.

The product can be built up of n-type and p-type regions having all different resistivities.

The process can accommdate a wide variety of materials and types of transistors at low cost and practical control for materials having different melting points, vapor pressures and degrees of contamination.

In producing the single crystal in a high vacuum the interstitial retention of gases such as occurs with growing a crystal in helium or hydrogen, is avoided.

Because of the precise control of thickness of the layer (W) by counting the shots, the less this is, the cheaper the product. And this is an important distinction over prior processes where the thinner products are more costly to produce because of the larger number of rejects and the spread of variation in thickness which is inherent in a statistical process.

This new product provides greater gain and less noise and a uniform thickness and minimum of contaminant with maximum effectiveness and even distribution of the centers in the superlattice structure gives the product a minimum base current and a high saturation, providing a gain improvement over prior products.

The method disclosed of exploding the metals and alloys and condensing them as a deposited layer from the gas phase of the metals and alloys in high vacuum, produces by epitaxic incrustation a continuation of the seeding crystal lattice form throughout the deposited layers.

The mechanism for handling and placing the wire is shown in a more or less elemental form and it is contemplated that the wire feeding or suply mechanism may be automatic, to maintain uniformity and the highest production rate possible.

Baffles such as indicated at 40 in Fig. 1 may be provided to prevent creepage of metal deposit over the inner electrode of the coaxial transmission line and other desirable controls and safety features may be employed.

In the following claims reference is made to "p-type" and "n-type" contaminants. As described above, the "p-type" contaminant is selected from the group exemplified by aluminum, boron, gallium, and indium to provide a positive or "hole" type semiconductor. The "n-type" contaminant is selected from the group exemplified by antimony, arsenic and phosphorus. It is to be understood, of course, that a junction formed of a layer of germanium or silicon with a "p-type" contaminant superposed and such material with an "n-type" contaminant may be reversed, so long as layers with opposite contaminants are superposed on each other, each layer being formed by the successive explosions of a series of wires containing the desired contaminant.

What is claimed is:

1. An npn transistor comprising a type n seed crystal of a metal selected from the group consisting of germanium and silicon, successive superposed thin films of type p of the same metal integrally united with each other and with said seed crystal in the same lattice formation to form a p-type layer and successive superposed thin films of type n of the same metal integrally united with each other and with said p-type layer in the same lattice formation to form an n-type layer superposed on said p-type layer.

2. The method of growing a monocrystalline layer of a solid substance upon an underlying crystalline surface of a base substance, said base substance having a crystal lattice pattern which is compatible with the lattice pattern of said solid substance, said method comprising the steps of successively exploding a series of separate quantities of said solid substance to form successive quantities of a monomolecular gas therefrom, depositing said gas initially upon said base substance to form a thin film of said solid substance thereon, said gas being subsequently deposited upon a previously deposited thin film, maintaining a vacuum in which said preceding steps are performed and spacing said successive exploding steps apart by intervening time intervals sufficient to permit adjustment of each thin film to said lattice pattern by epitaxy before the next thin film is superposed thereon, said superposed thin films forming said monocrystalline layer and being sufficient in number to provide a desired thickness for said monocrystalline layer.

3. The method according to claim 2, comprising the further step of maintaining said crystalline surface and said thin films at the annealing temperature of said solid substance for accelerating said adjustment.

4. The method according to claim 2, wherein said step of exploding said solid substance to form said gas comprises heating said solid substance to a temperature of the order of 20,000° C.

5. The method according to claim 4, wherein said heating step is performed within a time interval of the order of 10 miscroseconds.

6. The method according to claim 4, wherein said exploding step is performed at a pressure sufficiently low so that the length of the mean free path of a molecule of said gas exceeds the distance from the place where said exploding step is performed to said surface of said base substance.

7. The method of building up a monocrystalline structure by successive deposits of a metal upon an underlying crystalline base having a lattice pattern which is compatible with lattice pattern of said metal, said method comprising the steps of placing a thin wire formed of said metal in proximity to and in free communication with said base, reducing the atmospheric pressure surrounding said wire and said base so that the mean free path of a molecule of said metal therein is greater than the distance from said wire to said base, exploding said wire by passing an electric current of high intensity and short duration therethrough, said exploding causing said wire to be transformed into a monomolecular gas which becomes deposited on said base in the form of a thin film which conforms to the lattice pattern of said metal and repeating said plating and exploding steps at said reduced pressure successively with a series of said wires to build up a monocrystalline layer of desired thickness deposited on said base, successive exploding steps being spaced apart by a time interval sufficient to permit each thin film to adjust itself by epitaxy to said lattice pattern before the next film is deposited thereon.

8. The method according to claim 7, comprising the further step of maintaining said base and said thin films at the annealing temperature of said metal for accelerating said adjustment.

9. The method according to claim 7, comprising the further step of generating a strong magnetic field directed axially along said wire for confining the arc accompanying said exploding step to a very small cylindrical volume coaxially surrounding said wire.

10. The method according to claim 7, including surrounding said base in a hollow cylindrical conductor and locating said wire axially within the same to form a coaxial transmission line for axially equalizing the transient magnetic fields accompanying said explosion and preventing said wire from being blown to one side by said current.

11. The method according to claim 10, comprising the further step of magnetically shielding said transmission line to exclude the influence of stray fields on said wire during said exploding step.

12. The method of forming a transistor upon a base seed crystal of a material selected from the group consisting of germanium and silicon, said seed crystal material containing a contaminant selected from one of the two groups consisting of "p-type" contaminants and "n-type" contaminants, said method comprising the step of placing a wire formed of said material in proximity to and in free communication with said seed crystal, said wire containing a contaminant selected from the other of said two groups of contaminants, evacuating the region between said seed crystal and said wire to produce an atmospheric pressure sufficiently low to provide a mean free path for a molecule of said material which is greater than the distance from said wire to said seed crystal, surging an electric current of high intensity and short duration through said wire to explode said wire and transform it into a monomolecular superheated gas which becomes deposited on said seed crystal and solidifies thereon in the form of a thin film, repeating said surging step with successive wires containing the same contaminant as said first-named wire to build up a first layer of said thin films of desired thickness, and repeating said surging step with successive wires containing the same contaminant as said seed crystal to build up a second layer of desired thickness superposed upon said first layer, successive surging steps being spaced apart by a time interval sufficient to permit each thin film to adjust itself by epitaxy to said lattice pattern of said seed crystal.

13. The method according to claim 12, comprising the further step of maintaining said seed crystal and said thin layers at the annealing temperature of said material for accelerating said adjustment.

14. The method according to claim 12, comprising the further step of selectively screening a predetermined portion of the area of said first layer during the building up of said second layer, whereby said second layer extends over only a portion of said first layer thereby providing access to said first layer for attaching an electrical terminal thereto.

15. The method according to claim 12, wherein said seed crystal is disposed on a backbone of silicon carbide, said method comprising the preliminary step of forming said seed crystal as a base layer of said material deposited on said backbone by the exploding of a series of wires formed of said material and comprising said contaminant selected from said one group prior to exploding said first-named wire.

16. The method according to claim 12, including surrounding said seed crystal by a hollow cylindrical conductor and locating said wire axially therein to form a coaxial transmission line for axially equalizing the magnetic fields accompanying said explosion and preventing said wire from being blown to one side by said current.

17. The method according to claim 16, comprising the further step of magnetically shielding said transmission line to exclude the influence of stray fields on said wire during said exploding step.

18. The method according to claim 12, comprising the further step of generating a strong magnetic field directed axially along said wire for confining the arc accompanying said surging step to a very small cylindrical volume coaxially surrounding said wire.

19. The method of simultaneously forming a plurality of transistors each upon a base seed crystal formed of a material selected from the group consisting of germanium and silicon, said material in said seed crystal further containing a contaminant selected from one of the two groups consisting of "p-type" contaminants and "n-type" contaminants, said method comprising the steps of disposing said seed crystals around the internal periphery of a hollow cylindrical supporting structure, disposing a wire formed of said material within said supporting structure to extend axially thereof in proximity to and in free communication with all of said seed crystals, said wire containing a contaminant selected from the other of said two groups, evacuating the region within said supporting structure to produce an atmospheric pressure sufficiently low to provide a mean free path for a molecule of said material which is greater than the distance from said wire to said supporting structure, surging an electric current of high intensity and short duration through said wire to explode said wire and transform it into a monomolecular superheated gas at a temperature of the order of 20,000° C. said gas becoming deposited on all of said seed crystals and solidifying thereon in a thin film conformity with the lattice pattern of said seed crystals, surrounding said supporting structure with a cylindrical conductor coaxially with said wire for axially equalizing the magnetic fields accompanying said surging, maintaining a magnetic field of high intensity directed axially along said wire for confining the arc accompanying said surging, repeating said surging step with successive wires containing the same contaminant as said first-named wire to build up a first layer of superposed thin films of a desired total thickness on each of said seed crystals, repeating said surging step with successive wires containing the same contaminant as said seed crystal to build up a second layer of superposed thin films of a desired total thickness superposed upon said first layer of each of said seed crystals, spacing successive surging steps apart by a time interval sufficient to permit each thin film to adjust itself by epitaxy to said lattice pattern and maintaining said crystals and said thin films at the annealing temperature of said material for accelerating said adjustment.

20. The method according to claim 19, comprising the further step of magnetically shielding said supporting structure to exclude stray fields therefrom.

21. The method according to claim 19, comprising the further step of simultaneously screening a predetermined portion of each of the respective areas of all of said first layers during the building up of said second layers thereon for confining said second layers to predetermined portions of said first layers.

22. The method according to claim 19, wherein each of said seed crystals is disposed upon a backbone of silicon carbide, said method comprising the preliminary step of simultaneously forming each of said seed crystals as a base layer of said material comprising a contaminant selected from said one group, said base layer being deposited on said backbone by the exploding of a series of wires containing said contaminant selected from said one group prior to the explosion of said first-named wire.

23. The method of forming a p-n junction upon a base seed crystal of a material selected from the group consisting of germanium and silicon, said seed crystal containing a contaminant selected from one of the two groups consisting of "p-type" contaminants and "n-type" contaminants, said method comprising the steps of placing a wire formed of said material in proximity to and in free communication with said seed crystal, said wire containing a contaminant selected from the other of said two groups of contaminants, evacuating the region between said wire and said seed crystal to produce an atmospheric pressure sufficiently low to provide a mean free path for a molecule of said material which is longer than the distance from said wire to said seed crystal, surging an electric current of high intensity and short duration through said wire to explode said wire and transform it into a monomolecular superheated gas which becomes deposited on said seed crystal and solidifies thereon in the form of a thin film, maintaining a magnetic field of high intensity directed axially along said wire for confining the arc accompanying said surging step to a small cylindrical volume, electrostatically shielding said wire by a hollow cylindrical conductor to equalize axially the transient magnetic fields accompanying said surging step, magnetically shielding the region surrounding said wire to exclude stray magnetic fields therefrom, repeating said surging step with successive wires containing the same contaminant as said first-named wire to build up a layer of said thin films of a desired total thickness, successive surging steps being spaced apart by a time interval sufficient to permit each thin film to adjust itself by epitaxy to the lattice pattern of said seed crystal, and maintaining said seed crystal and said thin films at the annealing temperature of said material for accelerating said adjustment.

References Cited in the file of this patent

UNITED STATES PATENTS

| | | |
|---|---|---|
| 2,153,786 | Alexander et al. | Apr. 11, 1939 |
| 2,401,443 | Weinrich | June 4, 1946 |
| 2,410,720 | Dimmick | Nov. 5, 1946 |
| 2,560,792 | Gibney | July 17, 1951 |
| 2,631,356 | Sparks | Mar. 17, 1953 |
| 2,695,852 | Sparks | Nov. 30, 1954 |
| 2,710,270 | Cox | June 7, 1955 |
| 2,727,840 | Teal | Dec. 20, 1955 |

OTHER REFERENCES

Holden: Transactions of the A. S. M., vol. 42, pages 330, 331, 333, 334; 1950.